US010133675B2

(12) United States Patent
Hansson et al.

(10) Patent No.: US 10,133,675 B2
(45) Date of Patent: Nov. 20, 2018

(54) DATA PROCESSING APPARATUS, AND A METHOD OF HANDLING ADDRESS TRANSLATION WITHIN A DATA PROCESSING APPARATUS (71) Applicant: ARM LIMITED, Cambridge (GB)

(72) Inventors: Andreas Hansson, Cambridge (GB); Ali Saidi, Austin, TX (US); Aniruddha Nagendran Udipi, Mountain View, CA (US); Stephan Diestelhorst, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/325,250

(22) PCT Filed: Jun. 22, 2015

(86) PCT No.: PCT/GB2015/051809
§ 371 (c)(1),
(2) Date: Jan. 10, 2017

(87) PCT Pub. No.: WO2016/016605
PCT Pub. Date: Feb. 4, 2016

(65) Prior Publication Data
US 2017/0185528 A1    Jun. 29, 2017

(30) Foreign Application Priority Data

Jul. 29, 2014    (GB) .................................. 1413397.9

(51) Int. Cl.
*G06F 12/10* (2016.01)
*G06F 12/1036* (2016.01)
(Continued)

(52) U.S. Cl.
CPC ...... *G06F 12/1036* (2013.01); *G06F 12/0862* (2013.01); *G06F 12/1009* (2013.01);
(Continued)

(58) Field of Classification Search
None
See application file for complete search history.

(56) References Cited

U.S. PATENT DOCUMENTS

2005/0071601 A1    3/2005    Luick
2006/0031640 A1*   2/2006    Henry ................. G06F 12/0802
                                                          711/126
(Continued)

FOREIGN PATENT DOCUMENTS

WO    WO 2011/114120    9/2011

OTHER PUBLICATIONS

International Search Report and Written Opinion of the ISA for PCT/GB2015/051809, dated Sep. 14, 2015, 11 pages.
(Continued)

*Primary Examiner* — Kaushikkumar M Patel
(74) *Attorney, Agent, or Firm* — Nixon & Vanderhye P.C.

(57) ABSTRACT

A data processing apparatus and method are provided for performing address translation in response to a memory access request issued by processing circuitry of the data processing apparatus and specifying a virtual address for a data item. Address translation circuitry performs an address translation process with reference to at least one descriptor provided by at least one page table, in order to produce a modified memory access request specifying a physical address for the data item. The address translation circuitry includes page table walk circuitry configured to generate at least one page table walk request in order to retrieve the at least one descriptor required for the address translation process. In addition, walk ahead circuitry is located in a path between the address translation circuitry and a memory device containing the at least one page table. The walk ahead circuitry comprises detection circuitry used to detect a memory page table walk request generated by the page table walk circuitry of the address translation circuitry for a
(Continued)

descriptor in a page table. In addition, the walk ahead circuitry has further request generation circuitry which is used to generate a prefetch memory request in order to prefetch data from the memory device at a physical address determined with reference to the descriptor requested by the detected memory page table walk request. This prefetched data may be another descriptor required as part of the address translation process, or may be the actual data item being requested by the processing circuitry. Such an approach can significantly reduce latency associated with the address translation process.

22 Claims, 7 Drawing Sheets (51) Int. Cl.
G06F 12/0862 (2016.01)
G06F 12/1009 (2016.01)
G06F 12/1027 (2016.01)

(52) U.S. Cl.
CPC .. *G06F 12/1027* (2013.01); *G06F 2212/1016* (2013.01); *G06F 2212/651* (2013.01); *G06F 2212/654* (2013.01); *G06F 2212/657* (2013.01); *G06F 2212/681* (2013.01); *G06F 2212/684* (2013.01); *Y02D 10/13* (2018.01)

(56) References Cited

U.S. PATENT DOCUMENTS

| | | | | |
|---|---|---|---|---|
| 2006/0136696 A1* | 6/2006 | Grayson | ............ | G06F 12/1027 711/206 |
| 2008/0282056 A1* | 11/2008 | Bond | .................. | G06F 9/45537 711/207 |
| 2010/0250853 A1* | 9/2010 | Krieger | ............... | G06F 12/1027 711/122 |
| 2010/0250859 A1 | 9/2010 | Hooker et al. | | |
| 2011/0010521 A1 | 1/2011 | Wang et al. | | |
| 2012/0226888 A1 | 9/2012 | Rychlik et al. | | |
| 2013/0166874 A1 | 6/2013 | Auernhammer et al. | | |
| 2013/0227245 A1* | 8/2013 | Gupta | .................. | G06F 12/1027 711/205 |
| 2014/0052917 A1 | 2/2014 | Koka et al. | | |
| 2014/0108766 A1* | 4/2014 | Desai | .................. | G06F 12/1027 711/205 |
| 2014/0149632 A1* | 5/2014 | Kannan | ............... | G06F 12/0862 711/3 |
| 2014/0149679 A1* | 5/2014 | Rowlands | ........... | G06F 12/0862 711/137 |
| 2014/0156930 A1 | 6/2014 | Isloorkar | | |
| 2014/0181460 A1 | 6/2014 | Hsu et al. | | |
| 2014/0281351 A1* | 9/2014 | Topp | .................... | G06F 12/1027 711/205 |
| 2014/0281352 A1* | 9/2014 | Venkatsubramanian | .................... | G06F 12/1027 711/205 |
| 2015/0199275 A1* | 7/2015 | Radhakrishnan | ... | G06F 12/0862 711/137 |

OTHER PUBLICATIONS

Search Report for GB 1413397.9, dated Jan. 30, 2015, 4 pages.
Kandiraju et al., "Going the distance for TLB prefetching: an application-driven study", Proceedings of the $29^{th}$ International Symposium on Computer Architecture (ISCA 2002), IEEE, published May 25, 2002, pp. 195-206.
Barr et al., Translation Caching: Skip, Don't Walk (the Page Table), ISCA '10, Jun. 19-23, 2010, pp. 48-59.
Bhattacharjee et al., Shared Last-Level TLBs for Chip Multiprocessors, HPCA '11 Proceedings of the 2011 IEEE 17th International Symposium on High Performance Computer Architecture, Feb. 12-16, 2011, 12 pages.

* cited by examiner

DATA PROCESSING APPARATUS, AND A METHOD OF HANDLING ADDRESS TRANSLATION WITHIN A DATA PROCESSING APPARATUS

This application is the U.S. national phase of International Application No. PCT/GB2015/051809 filed 22 Jun. 2015, which designated the U.S. and claims priority to GB Patent Application No. 1413397.9 filed 29 Jul. 2014, the entire contents of each of which are hereby incorporated by reference.

FIELD OF THE INVENTION

The present invention relates to a data processing apparatus, and to a method of handling address translation within such a data processing apparatus.

BACKGROUND OF THE INVENTION

Within a data processing system, when a master device wishes to perform read or write operations, the master device will typically issue an access request specifying a virtual address for the data item to be read or written. This virtual address then needs to be translated into a physical address within a memory device in order to identify the actual physical location in memory from which the data item is to be read or to which the data item is to be written.

There will typically be various components residing in the path between the master device and the memory device, for example various levels of cache, various interconnect structures, etc., and typically the address translation is performed by a memory management unit residing in close proximity to the master device along the path between the master device and the memory device.

Such a memory management unit (MMU) will typically include a translation lookaside buffer (TLB) structure for holding descriptor information obtained from page tables residing in the memory device, each descriptor providing information used to translate a portion of the virtual address to a corresponding portion of the physical address. If for a particular portion of a virtual address under consideration, there is no corresponding descriptor stored within the TLB, then page table walk circuitry within the MMU is typically used to perform a page table walk process in order to obtain the required descriptor from the memory device to enable the address translation process to be performed.

In association with a master device's MMU, it is known to implement prefetching mechanisms that seek to detect patterns between the various different access requests being issued by the master device, and based on those patterns to prefetch descriptor information into the TLB to thereby seek to avoid the latency/performance issues that occur when a descriptor is not available in the TLB for a future access request, and hence needs to be retrieved via the page table walk process. However, whilst such pattern recognition based prefetching mechanisms are useful, and can help to reduce latency, there are still other aspects of the virtual to physical address translation process that can introduce latency issues when seeking to process any individual access request.

In particular, considering an individual access request, a portion of the specified virtual address will typically be used in combination with a page table base address to identify a physical address for a descriptor that will be needed as part of the address translation process. At a minimum, once that descriptor has been obtained (via a page table walk process if necessary), then that descriptor will need to be used in combination with another portion of the virtual address to identify the actual physical address of the data item that is to be read or written. Accordingly, even in this simple case, there may be a need to access the memory device twice in order to process the read or write operation, once to retrieve the descriptor via a page table walk process, and once to actually access the data item.

In modern data processing systems, the number of accesses to memory that may be required when processing a single access request can increase significantly over the simple case referred to above. In particular, in modern data processing systems, where the size of the memory device is getting larger and larger, it is known to use multiple levels of page tables when performing the address translation process. In particular, at a first page table level, a portion of the virtual address may be combined with a page table base address to identify a physical address of a descriptor that is required as part of the address translation process. However, once that descriptor has been obtained, then that descriptor is used in combination with another portion of the virtual address to identify a descriptor in an additional page table at a further page table level. This process can be repeated multiple times before a final level of the page table hierarchy is reached, with the descriptor obtained from that final page table level then being combined with another virtual address portion in order to identify the physical address of the data item to be accessed.

Thus, it will be appreciated that even when considering a single access request, the address translation process may require the memory device to be accessed multiple times, and this can give rise to significant latency issues. Accordingly, it would be desirable to provide a mechanism that can alleviate the latency issues associated with the multiple stages of address translation required when processing each individual memory access request.

SUMMARY OF THE INVENTION

Viewed from a first aspect, the present invention provides a data processing apparatus comprising: processing circuitry configured to issue a memory access request specifying a virtual address for a data item; address translation circuitry configured to perform an address translation process with reference to at least one descriptor provided by at least one page table, in order to produce a modified memory access request specifying a physical address for the data item, the address translation circuitry including page table walk circuitry configured to generate at least one memory page table walk request in order to retrieve the at least one descriptor required for the address translation process; walk ahead circuitry located in a path between the address translation circuitry and a memory device containing the at least one page table, the walk ahead circuitry comprising: detection circuitry configured to detect a memory page table walk request generated by the page table walk circuitry of the address translation circuitry for a descriptor in a page table, and further request generation circuitry configured to generate a prefetch memory request in order to prefetch data from the memory device at a physical address determined with reference to the descriptor requested by the detected memory page table walk request.

In accordance with the present invention, walk ahead circuitry is provided that is located in a path between the address translation circuitry and the memory device. When the page table walk circuitry of the address translation circuitry issues a memory page table walk request in order to retrieve a descriptor in a page table, the walk ahead circuitry detects that memory page table walk request. Then, once the descriptor being requested is available (for example by virtue of it being retrieved from the memory device or being buffered in some storage structure accessible by the walk ahead circuitry), the walk ahead circuitry is configured to generate a prefetch memory request in order to prefetch data from the memory device at a physical address determined with reference to that descriptor. Hence, the walk ahead circuitry speculatively performs at least one additional stage of the address translation process in order to prefetch the data at that next stage of the address translation process. That prefetched data may in fact be the actual data item that is the subject of the original memory access request, or may be another descriptor required by the address translation process.

By such a process, once the page table walk circuitry within the address translation circuitry receives the descriptor that it had requested via the memory page table walk request, then when it issues a subsequent request based on that descriptor (whether that be another memory page table walk request for a descriptor at the next level of the address translation process, or a request for the actual data item), then that descriptor or data item will be available with less latency, due to the fact that it has already been prefetched from the memory device by the walk ahead circuitry. This can hence significantly reduce the latency of the address translation process for each individual memory access request.

There are a number of ways in which the further request generation circuitry within the walk ahead circuitry can be configured to generate a prefetch memory request. In one embodiment, the page table walk circuitry is configured to include, within the detected memory page table walk request, additional information not required to retrieve the descriptor requested by that detected memory page table walk request, and the further request generation circuitry is configured to use that additional information when generating the prefetch memory request.

The additional information that the page table walk circuitry includes within the memory page table walk request can take a variety of forms. However, in one embodiment, the page table walk circuitry is configured to use a portion of the virtual address in order to determine a descriptor address, and to include within the detected page table walk request that descriptor address. In addition, the page table walk circuitry is further configured to include, as said additional information, a further portion of the virtual address. Hence, in such embodiments, once the descriptor being requested by the detected memory page table walk request is available, the further request generation circuitry can use that descriptor in combination with the further portion of the virtual address in order to determine the address to be specified in association with the prefetch memory request, and thus identify the data to prefetched from the memory device in response to that prefetch memory request.

Whilst the address translation process can take a variety of forms, in one embodiment the address translation circuitry is configured to perform, as the address translation process, a multi-level address translation process with reference to descriptors provided by a plurality of page tables configured in multiple hierarchical levels, and the page table walk circuitry is configured to generate memory page table walk requests in order to retrieve the descriptors required for the multi-level address translation process. The memory page table walk request detected by the detection circuitry is for a descriptor in a page table at one hierarchical level, and the further request generation circuitry is configured to generate as the prefetch memory request, for each of at least one subsequent hierarchical level, a prefetch memory page table walk request in order to prefetch an associated descriptor in a page table at that subsequent hierarchical level.

Hence, in such embodiments the walk ahead circuitry is used to prefetch one or more descriptors at subsequent hierarchical levels of the page table hierarchy, so that if the address translation circuitry subsequently issues memory page table walk requests for those descriptors, they will have been prefetched from the memory device and accordingly can be provided with significantly reduced latency back to the address translation circuitry, hence speeding up the address translation process.

In one embodiment, the further request generation circuitry is configured to determine a descriptor address for the associated descriptor in a page table at a first subsequent hierarchical level with reference to said further portion of the virtual address and the descriptor retrieved as a result of the memory device processing the detected memory page table walk request. The further request generation circuitry is then further configured to include the determined descriptor address within the generated prefetch memory page table walk request for said first subsequent hierarchical level.

Furthermore, in one embodiment, for each additional subsequent hierarchical level, the further request generation circuitry is configured to determine a descriptor address for the associated descriptor in a page table at that additional subsequent hierarchical level with reference to said further portion of the virtual address and the descriptor obtained as a result of the memory device processing the prefetch memory page table walk request for a preceding subsequent hierarchical level.

Hence, the operation of the further request generation circuitry can be repeated iteratively for each subsequent hierarchical level, at each level the further request generation circuitry using a further portion of the virtual address and the descriptor obtained for the previous hierarchical level.

In embodiments where the further request generation circuitry generates a prefetch memory page table walk request for each of the multiple subsequent hierarchical levels, the page table walk circuitry may further be configured to include within the detected page table walk request, level indication data used by the further request generation circuitry to determine which bits of the further portion of the virtual address to use when generating the prefetch memory page table walk request at each of the multiple subsequent hierarchical levels. In particular, it will typically be the case that different bits of the further portion of the virtual address are used at each different hierarchical level.

In one embodiment, for a final hierarchical level, the further request generation circuitry may further be configured to generate a prefetch modified memory access request specifying a physical address for the data item in order to prefetch the data item. Hence, in such embodiments, the walk ahead circuitry can be used not only to prefetch descriptors at subsequent hierarchical levels of the page table hierarchy, but can also be used to prefetch the actual data item that the processing circuitry is seeking to access.

In one embodiment, the walk ahead circuitry further includes a walk ahead storage structure configured to store the associated descriptor retrieved from the memory device as a result of each prefetch memory page table walk request. In embodiments where the ultimate data item that the processing circuitry is seeking to access is also prefetched, then the walk ahead storage structure may also be used to store that prefetched data item as retrieved from the memory device.

The walk ahead storage structure can take a variety of forms, but in one embodiment is configured as a cache. For each memory page table walk request and/or modified memory access request issued by the address translation circuitry, a lookup can then be performed in the cache to determine whether the required descriptor or data item is present in the cache, i.e. whether it has been prefetched. If it has, then that descriptor or data item can be returned to the address translation circuitry directly from the cache without the requirement for any further memory device access.

Whilst in one embodiment the walk ahead circuitry may be configured to prefetch descriptors for each of the subsequent hierarchical levels of the page table hierarchy, in an alternative embodiment the walk ahead circuitry may be configured to be responsive to control information to determine the number of subsequent hierarchical levels for which associated descriptors are prefetched ahead of a current hierarchical level for which the page table walk circuitry has generated a memory page table walk request.

The control information can take a variety of forms, and in one embodiment can be a simple count value identifying the number of hierarchical levels for which associated descriptors should be prefetched. Whilst the walk ahead circuitry is merely prefetching information, and if it prefetches more information than is actually needed there is no adverse consequence on the correct operation of the system, there is power consumed in performing the prefetching and accordingly in certain situations, for example where there are many different hierarchical levels, it may be appropriate to not allow the prefetching to get too many stages ahead of the operation of the page table walk circuitry within the address translation circuitry itself. For example, it may be the case that certain descriptor information, and/or the requested data item may be cached at other places within the system closer to the processing circuitry than the walk ahead circuitry, such that at one or more subsequent levels the associated memory page table walk request or the modified memory access request is not propagated as far as the walk ahead circuitry and accordingly does not require any action by the walk ahead circuitry. Accordingly, the control information can be configured so as to qualify how many hierarchical levels are prefetched ahead of the actual hierarchical level being considered by the page table walk circuitry, to reduce the possibility of power being consumed unnecessarily during the prefetching process, by seeking to reduce the prospect of prefetching information that is not actually required.

The walk ahead circuitry may be located in a variety of places within the data process apparatus, but in one embodiment is provided within a memory controller associated with the memory device. Hence, in such embodiments the walk ahead circuitry is provided in close proximity to the memory device itself.

In one such embodiment, the walk ahead circuitry may be configured to reuse at least one existing component of the memory controller, thereby reducing the cost associated with providing the walk ahead circuitry. In one particular embodiment, the walk ahead storage structure of the walk ahead circuitry is provided by a read data queue within the memory controller, hence avoiding the need for the provision of a separate walk ahead storage structure.

In one embodiment, a descriptor provided in a page table at one hierarchical level provides a base address for a page table in a subsequent hierarchical level. Further, in one embodiment, a descriptor provided in a page table at a final hierarchical level provides a base address for a memory page containing the data item associated with the virtual address specified in the memory access request.

There are a number of ways in which the detection circuitry of the walk ahead circuitry can be arranged to detect a memory page table walk request. For example, where that memory page table walk request includes additional information not required to retrieve the descriptor requested by that memory page table walk request, the presence of that additional information may itself be used to detect the request as being a memory page table walk request for which some prefetching should be performed. However, in an alternative embodiment, the page table walk circuitry is configured to include, within the detected memory page table walk request, a flag field set to identify the request as a memory page table walk request. This provides a simple mechanism for detecting such memory page table walk requests.

Viewed from a second aspect, the present invention provides walk ahead circuitry for use in a data processing apparatus having processing circuitry for issuing a memory access request specifying a virtual address for a data item, and address translation circuitry for performing an address translation process with reference to at least one descriptor provided by at least one page table, in order to produce a modified memory access request specifying a physical address for the data item, the address translation circuitry generating at least one memory page table walk request in order to retrieve the at least one descriptor required for the address translation process, the walk ahead circuitry being configured for locating in a path between the address translation circuitry and a memory device containing the at least one page table, and comprising: detection circuitry configured to detect a memory page table walk request generated by the address translation circuitry for a descriptor in a page table; and further request generation circuitry configured to generate a prefetch memory request in order to prefetch data from the memory device at a physical address determined with reference to the descriptor requested by the detected memory page table walk request.

Viewed from a third aspect the present invention provides a walk ahead circuit comprising: detection circuitry configured to detect a memory page table walk request generated by page table walk circuitry of an address translation circuit for a descriptor in a page table; and further request generation circuitry configured to generate a prefetch memory request in order to prefetch data from a memory device at a physical address determined with reference to the descriptor requested by the detected memory page table walk request.

Viewed from a fourth aspect, the present invention provides a method of handling address translation within a data processing apparatus, comprising: issuing from processing circuitry a memory access request specifying a virtual address for a data item; employing address translation circuitry to perform an address translation process with reference to at least one descriptor provided by at least one page table, in order to produce a modified memory access request specifying a physical address for the data item, including generating at least one memory page table walk request in order to retrieve the at least one descriptor required for the address translation process; employing walk ahead circuitry located in a path between the address translation circuitry and a memory device containing the at least one page table, to: detect a memory page table walk request generated by the page table walk circuitry of the address translation circuitry for a descriptor in a page table; and to generate a prefetch memory request in order to prefetch data from the memory device at a physical address determined with reference to the descriptor requested by the detected memory page table walk request.

Viewed from a fifth aspect, the present invention provides a data processing apparatus comprising: processing means for issuing a memory access request specifying a virtual address for a data item; address translation means for performing an address translation process with reference to at least one descriptor provided by at least one page table, in order to produce a modified memory access request specifying a physical address for the data item, the address translation means including page table walk means for generating at least one memory page table walk request in order to retrieve the at least one descriptor required for the address translation process; walk ahead means for locating in a path between the address translation means and a memory device containing the at least one page table, the walk ahead means comprising: detection means for detecting a memory page table walk request generated by the page table walk means of the address translation means for a descriptor in a page table; and further request generation means for generating a prefetch memory request in order to prefetch data from the memory device at a physical address determined with reference to the descriptor requested by the detected memory page table walk request.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
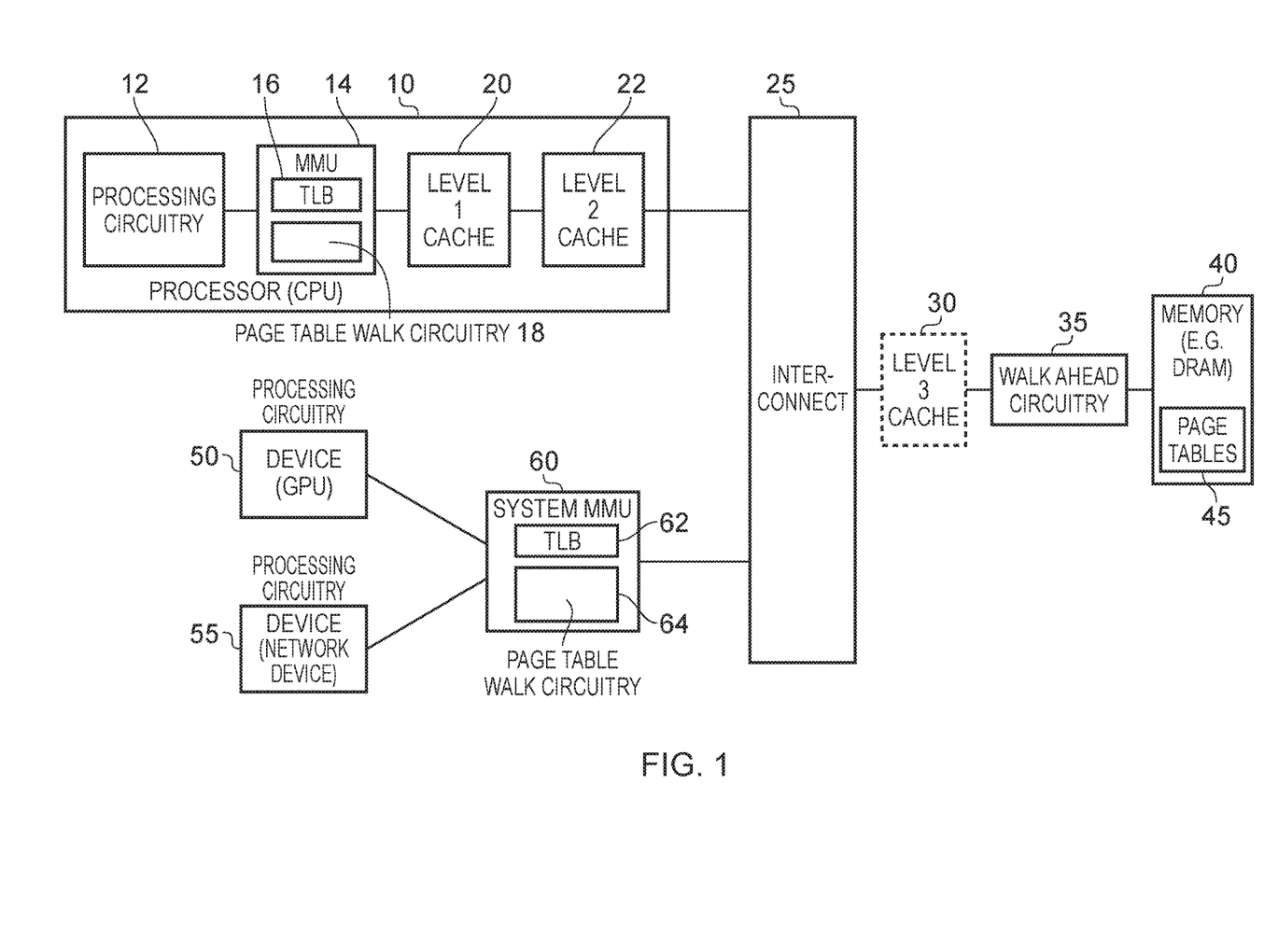
FIG. 1 is a block diagram of a data processing apparatus in accordance with one embodiment.

FIG. 1 is a block diagram of a data processing apparatus in accordance with one embodiment. Within a data processing apparatus, there will typically be at least one instance, but often multiple instances, of processing circuitry that can issue memory access requests in order to perform read and write operations, each memory access request specifying a virtual address for the data item to be read or written. Three example of such processing circuitry are shown in FIG. 1. In particular, processing circuitry 12 may be provided as part of a processor 10, that also includes an associated memory management unit (MMU) 14 and one or more levels of cache 20, 22. The processor 10 may form a central processing unit (CPU) of the data processing apparatus.

As also shown in FIG. 1, devices 50, 55 may provide additional instances of such processing circuitry. These devices can take a variety of forms, for example a graphics processing unit (GPU), a network device, etc. Such devices will also have an associated MMU, and by way of example the devices 50, 55 are assumed to share a system MMU 60.

As shown in FIG. 1, the various processing circuits are connected via an interconnect structure 25 with a memory device 40, which may for example be a Dynamic Random Access Memory (DRAM) device. One or more further levels of cache may reside in the path between the interconnect 25 and the memory device 40, such as the level 3 cache 30 shown in FIG. 1.

The memory management units 14, 60 are used to perform an address translation process in order to translate the virtual address specified by a memory access request from the associated processing circuitry into a physical address identifying a location within the memory device containing the data item that is the subject of the memory access request. The address translation process is performed with reference to at least one descriptor provided by at least one page table, the page tables typically residing in the memory device, as illustrated by the page tables 45 shown in FIG. 1. Page table walk circuitry 18, 64 is used to issue memory page table walk requests to the memory device 40 in order to retrieve individual descriptors required to perform the address translation process for a received memory access request from the associated processing circuitry. These descriptors can be buffered locally within the translation lookaside buffer (TLB) structures 16, 62. If the required descriptor already resides in the TLB, then the portion of the address translation processing using that descriptor can be performed without delay. However, if the descriptor that is required is not present in the TLB then it first must be retrieved by the page table walk circuitry issuing an appropriate page table walk request. Sometimes the descriptors required by a particular page table walk request may be cached in one of the levels of cache 20, 22, 30 within the system, and accordingly it is not necessary to access the memory device. However, in other instances it will be necessary for the page table walk request to be propagated all the way through to the memory device in order to retrieve the required descriptor, which is then returned to the MMU for storing in the associated TLB, and for use in the address translation process.

It is known to provide certain prefetching mechanisms with the MMUs 14, 60, in order to seek to identify patterns of access requests issued by the associated processing circuits. This can be used to seek to retrieve into the TLB a descriptor that may subsequently be needed by a future access request that has not yet been issued by the processing circuitry. However, whilst this can assist in reducing latency depending on the accuracy of the pattern detection mechanisms, another issue that gives rise to significant latency results from the address translation process itself required in connection with each individual memory access request. In particular, the address translation process is often performed in multiple stages. A first portion of the virtual address may be used in combination with a page table base address to identify the physical address of a descriptor in that page table. That descriptor then needs to be retrieved, whereafter some address information specified by that descriptor is combined with another portion of the virtual address in order to identify a further address that needs to be accessed as part of the address translation process. In a simple case where only a single level of page table is used, this latter address may itself identify the data item that needs to be retrieved.

However, even in that case, it will be appreciated that there are potentially two separate accesses that need to be made to the memory device in order to access the required data item.

Furthermore, in modern systems it is often the case that the page tables are arranged in multiple hierarchical levels, such that a multilevel address translation process is performed with reference to multiple different page tables. In particular, the descriptor retrieved from memory for one or more levels of the page table may itself identify a base address for another page table, with that base address being combined with another portion of the virtual address in order to identify a location of a further descriptor required as part of the address translation process. When that descriptor is returned, it may again be combined with another portion of the virtual address in order to identify a further descriptor at another level of the page table hierarchy that is also required as part of the address translation process. This process can iterate through multiple page table levels before the final level is reached, where the descriptor retrieved is combined with another portion of the virtual address in order to identify the actual address of the data item requiring access by the processing circuitry. Hence, it will be appreciated that when processing each individual memory access request, it may be necessary to perform multiple accesses to the memory device 40, and this can give rise to significant latency issues.

In accordance with one embodiment, as will be described in more detail below, walk ahead circuitry 35 is provided in a path between the address translation circuitry (provided by the MMUs, 14, 60) and the memory device 40, which is arranged to detect a memory page table walk request generated by the page table walk circuitry 18, 64. Once the descriptor specified by that memory page table walk request is available to the walk ahead circuitry, for example once it has been retrieved from the memory device 40, or if it is already cached within some structure available to the walk ahead circuitry 35, the walk ahead circuitry is then arranged to generate a prefetch memory request in order to prefetch data from the memory device at a physical address determined with reference to that descriptor. This data may itself be another descriptor required as part of the address translation process from another hierarchical level of the page table hierarchy, or may be the actual data item that the processing circuitry is seeking to access.

As a result, once the originally requested descriptor has been returned to the relevant MMU, if that descriptor information is then used to generate a further request, whether that be a further memory page table walk request, or a modified memory access request specifying the physical address of the data item, the walk ahead circuitry may be able to intercept that request and provide the required data directly, without the need to perform a further access to the memory device, hence significantly reducing latency.

Figure 2:
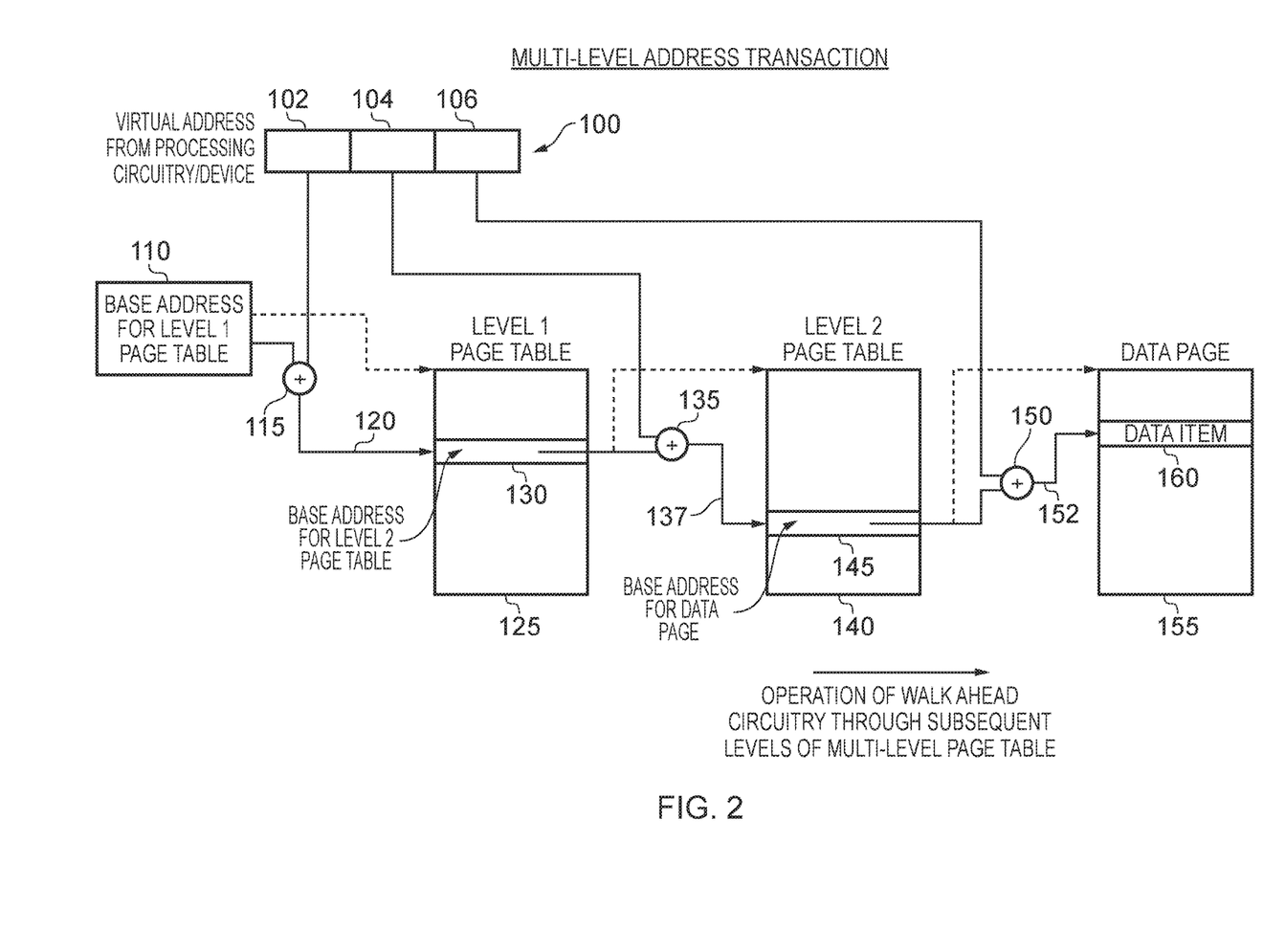
FIG. 2 illustrates multi-level address translation process performed in accordance with one embodiment.

FIG. 2 schematically illustrates the multi-level address translation process adopted in one embodiment. The incoming virtual address 100 specified as part of a memory access request issued by the processing circuitry can consist of virtual address portions 102, 104, 106. The first portion of the virtual address 102 is combined with a base address for a level one page table 110 (typically that base address being stored in a register accessible to the page table walk circuitry of the MMU) using the combinatorial circuitry 115 in order to generate an address 120 identifying a particular descriptor 130 within the level one page table 125. The combinatorial circuit 115 can take a variety of forms, but in one embodiment merely serves to add the virtual address as an offset to the base address in order to identify the relevant descriptor 130. The identified descriptor 130 actually provides a base address for a level 2 page table. Accordingly, once that descriptor has been obtained, a further page table walk request can be issued specifying an address 137 determined by the combinatorial circuitry 135 based on that base address retrieved from the descriptor 130 and a second virtual address portion 104 of the virtual address 100. In the example shown in FIG. 2, the identify descriptor 145 in the level two page table 140 then specifies a base address for the actual data page containing the requested data item. Accordingly, once that descriptor has been obtained, then a final stage of the address translation can be performed, where an access request is issued specifying address 152 generated by the combinatorial circuitry 150 based on the base address identified in the descriptor 145 and the third virtual address portion 106 of the virtual address 100. Performance of this final access request will cause the data item 160 to be accessed within the relevant data page 155.

Whilst all of these stages will need to be performed by the MMU 14, 60 and in some instances the relevant descriptors will already be cached within the relevant TLB 16, 62, in some instances one or more of these stages may require the page table walk circuitry 18, 64 to issue a memory page table walk request to retrieve at least one descriptor, and ultimately a modified memory access request in order to obtain the data item required. If, by way of example, the page table walk circuitry 18, 64 issues a memory page table walk request specifying the address 120 in order to retrieve a descriptor 130 within the level one page table 125, the walk ahead circuitry 35 can detect that situation, and speculatively prefetch the additional descriptor 145 once the descriptor 130 is available. Furthermore, if desired, it can go on to speculatively prefetch the data item 160 once the descriptor 145 is available as a result of the first prefetch operation. Assuming the page table walk circuitry 18, 64 in due course goes on to issue a further page table walk request specifying the address 137, in order to obtain the descriptor 145, and thereafter a modified memory access request specifying the address 152 in order to access the data item, both of those follow on requests can be processed much more quickly due to the data having already been retrieved from the memory device by the walk ahead circuitry 35.

From FIG. 2, it will be appreciated that in one embodiment, for the walk ahead circuitry to be able to perform the required prefetching operations, it needs access to the various virtual address portions 102, 104, 106 of the virtual address 100. In one embodiment, this additional virtual address information is provided in association with the original memory page table walk request issued by the page table walk circuitry 18, 64, to enable the walk ahead circuitry to have the required information necessary to perform the prefetching operations.

Figure 3:
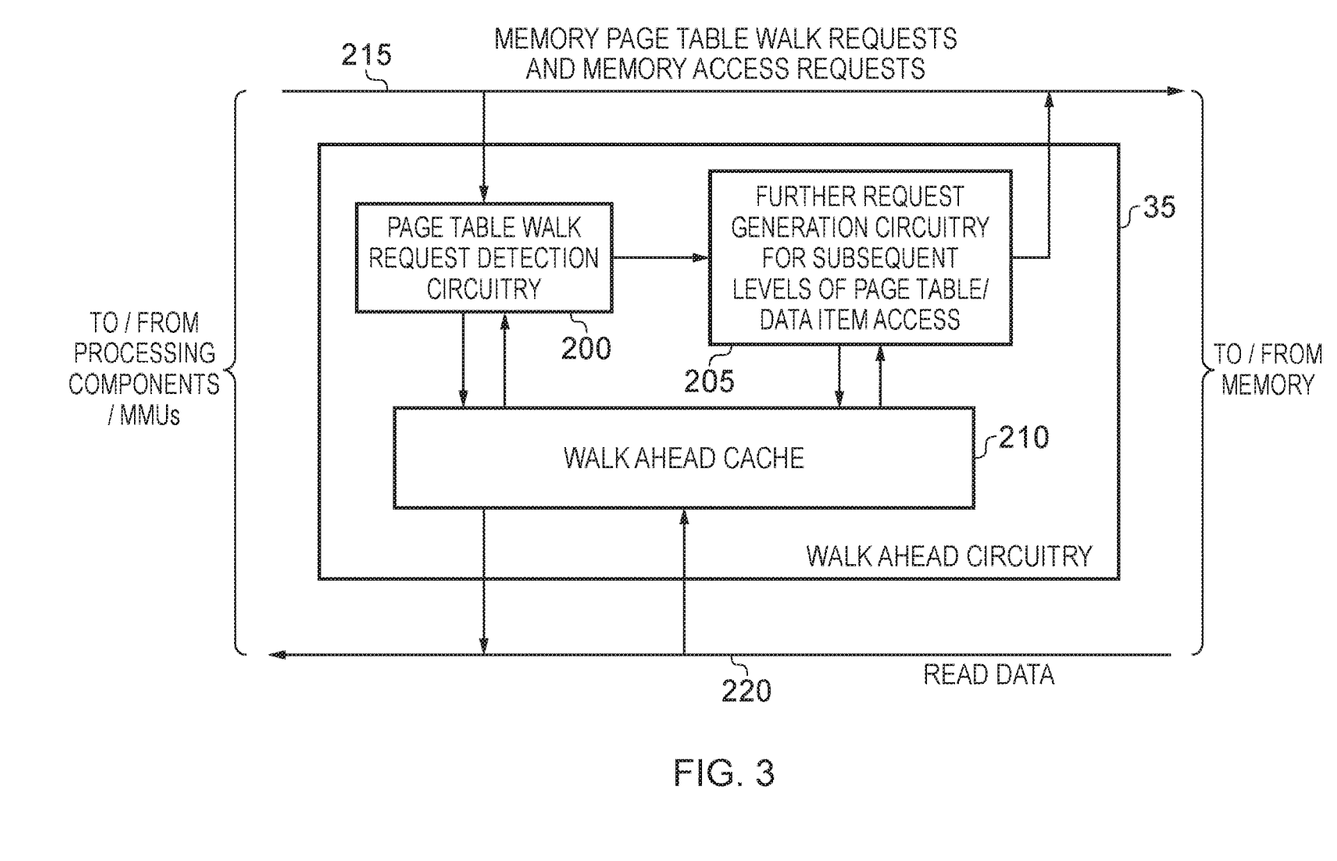
FIG. 3 is a block diagram illustrating in more detail elements provided within the walk ahead circuitry of FIG. 1 in accordance with one embodiment.

FIG. 3 is a block diagram illustrating in more detail components provided within the walk ahead circuitry 35 of FIG. 1 in accordance with one embodiment. The walk ahead circuitry includes a page table walk request detection circuit 200 for detecting, from the various access requests being routed over path 215 from the processing circuit components to the memory device, a memory page table walk request. On detecting such a memory page table walk request, a lookup is performed in the walk ahead cache 210 in order to determine whether the requested descriptor is already stored in the walk ahead cache, as will be the case if it has already been prefetched by a previous prefetch memory request issued by the walk ahead circuitry. If it is in the walk ahead cache 210, then the required descriptor can be returned directly over the read data path 220 back to the relevant MMU 14, 60. If the required descriptor is not in the walk ahead cache 210, then the memory page table walk request can be processed in the standard manner by the memory device 40, with the associated descriptor subsequently being returned over the read data path 220 to the MMU. At the same time, that returning descriptor information can be stored in the walk ahead cache 210 so that it is available subsequently for any memory page table walk requests seeking that descriptor.

In addition, when the detection circuitry 200 detects a page table walk request, the further request generation circuitry 205 can be used to generate one or more prefetch memory requests in order to prefetch additional descriptors and/or the data item from the memory device, to speed up the operation of the further stages of the address translation process illustrated in FIG. 2. It will be appreciated from FIG. 2 that at each level, the descriptor from the previous level needs to have first been obtained, and accordingly the further request generation circuitry 205 will access the walk ahead cache 210 in order to determine when the required descriptor is available. Considering again the example of FIG. 2, when the descriptor 130 is available in the walk ahead cache 210, the further request generation circuitry 205 can generate a prefetch memory request in order to access the level 2 page table 140 in order to retrieve the descriptor 145. Further, once the descriptor 145 is available in the walk ahead cache 210, the further request generation circuitry 205 can issue a prefetch modified memory access request specifying the physical address for the required data item in the data page 155, in order to cause the required data item 160 to be prefetched from the memory device. In one embodiment, the walk ahead cache 210 can also be used to cache such prefetched data items, in addition to any prefetched descriptors, and in that embodiment the page table walk request circuitry 200 can also be used to perform a lookup in the walk ahead cache 210 for any modified memory access requests issued from the MMUs/associated processing circuits. Again, this can significantly reduce latency by avoiding the need for the memory device to be accessed at that point, given that the required data item has already been prefetched into the walk ahead cache 210.

Whilst in FIG. 2 a two stage page table hierarchy is shown, it will be appreciated that the number of levels of page tables in the page table hierarchy may include more than two levels, with the process illustrated in FIG. 2 being repeated for each level of the page table hierarchy until the final hierarchical level is reached, whereafter the required data item in the relevant data page can then be accessed using the descriptor obtained from the final level of the page table hierarchy. The use of the prefetching mechanism of the described embodiments can significantly reduce latency associated with each of the subsequent levels of the page table translation process, and in association with the retrieval of the ultimate data item to be accessed.

Figures 4A, 4B:
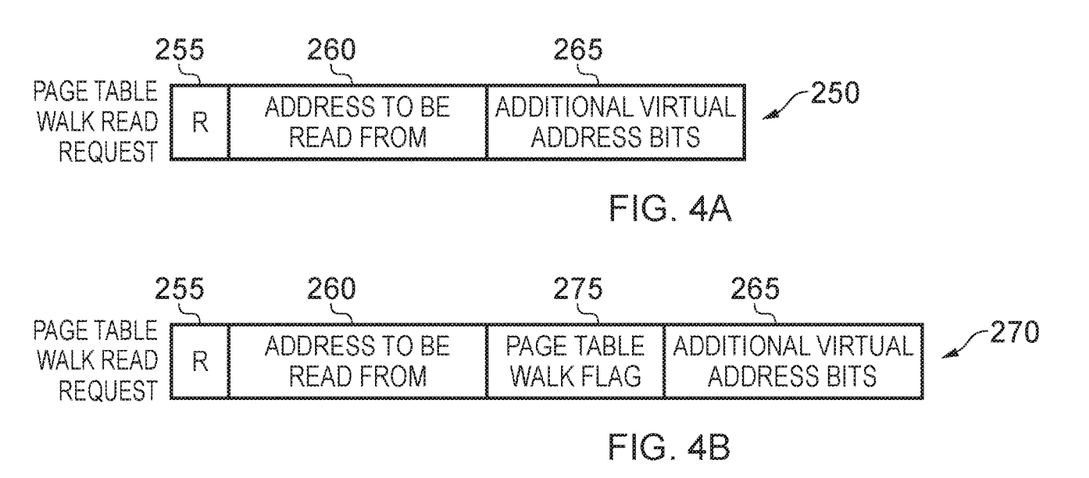
FIGS. 4A to 4C illustrates various formats of page table walk read requests that may be used in accordance with one embodiment.
Figure 4C:
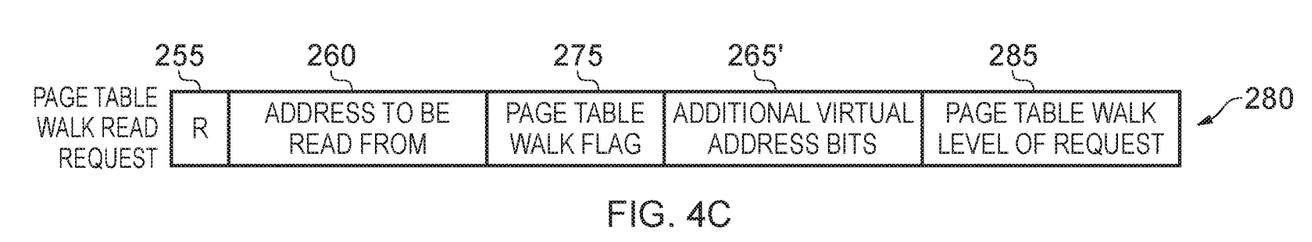

The page table walk read request issued by the page table walk circuitry 18, 64 can take a variety of forms, FIGS. 4A to 4C schematically illustrating three alternative forms. In each case, there will typically be a field 255 identifying the access request as a read access request, and there will also be an address portion field 260 identifying the address to be read from. It will be within this portion that the actual physical address for the descriptor to be read will be specified, for example the address 120 for the descriptor 130 in the level 1 page table shown in FIG. 2 or the address 137 for the descriptor 145 shown in the level 2 page table 140 of FIG. 2.

As shown in FIG. 4A, in one embodiment the page table walk read request will also specify additional virtual address bits 265 within the request 250, these additional virtual address bits being usable by the walk ahead circuitry 35 in order to construct the required physical address for a subsequent prefetch memory request to be issued by the walk ahead circuitry.

As shown in FIG. 4B, in an alternative embodiment the page table walk read request 270 may additionally include a field 275 including a flag which is set to identify that the request is a page table walk request for which the walk ahead circuitry should perform some associated prefetching. Alternatively, this flag may in some embodiments not be required, and the detection circuitry of the walk ahead circuitry may be able to determine that there is a page table walk request for which it should perform prefetching based on the presence of data in the additional virtual address bits field 265.

If the walk ahead circuitry is configured to perform only a single level of prefetching, then the additional virtual address bits field 265 will only need to specify the required virtual address bits for that single prefetch. For example, if the page table walk read request issued by the page table walk circuitry 18, 64 relates to accessing a descriptor in the level one page table, and the prefetch performed by the walk ahead circuitry is restricted to only prefetch the next descriptor from the level 2 page table, then the additional virtual address bits field 265 would only need to specify the virtual address bits 104 of FIG. 2. However, if the walk ahead circuitry is instead to prefetch from multiple subsequent levels, hence requiring multiple additional virtual address portions to be specified within the field 265, in one embodiment the page table walk read request 280 can take the form shown in FIG. 4C, where a field 285 is used to identify the current page table walk level of the request, and provide sufficient information to enable the walk ahead circuitry to interpret the additional virtual address bits provided within the field 265', and in particular to identify which bits to use in association with each prefetch memory request. Considering the example of FIG. 2, the information in the field 285 will hence identify that the virtual address bits 104 should be used for the first prefetch memory request issued, and that the virtual address bits 106 should be used for the next prefetch memory request issued.

Figure 5:
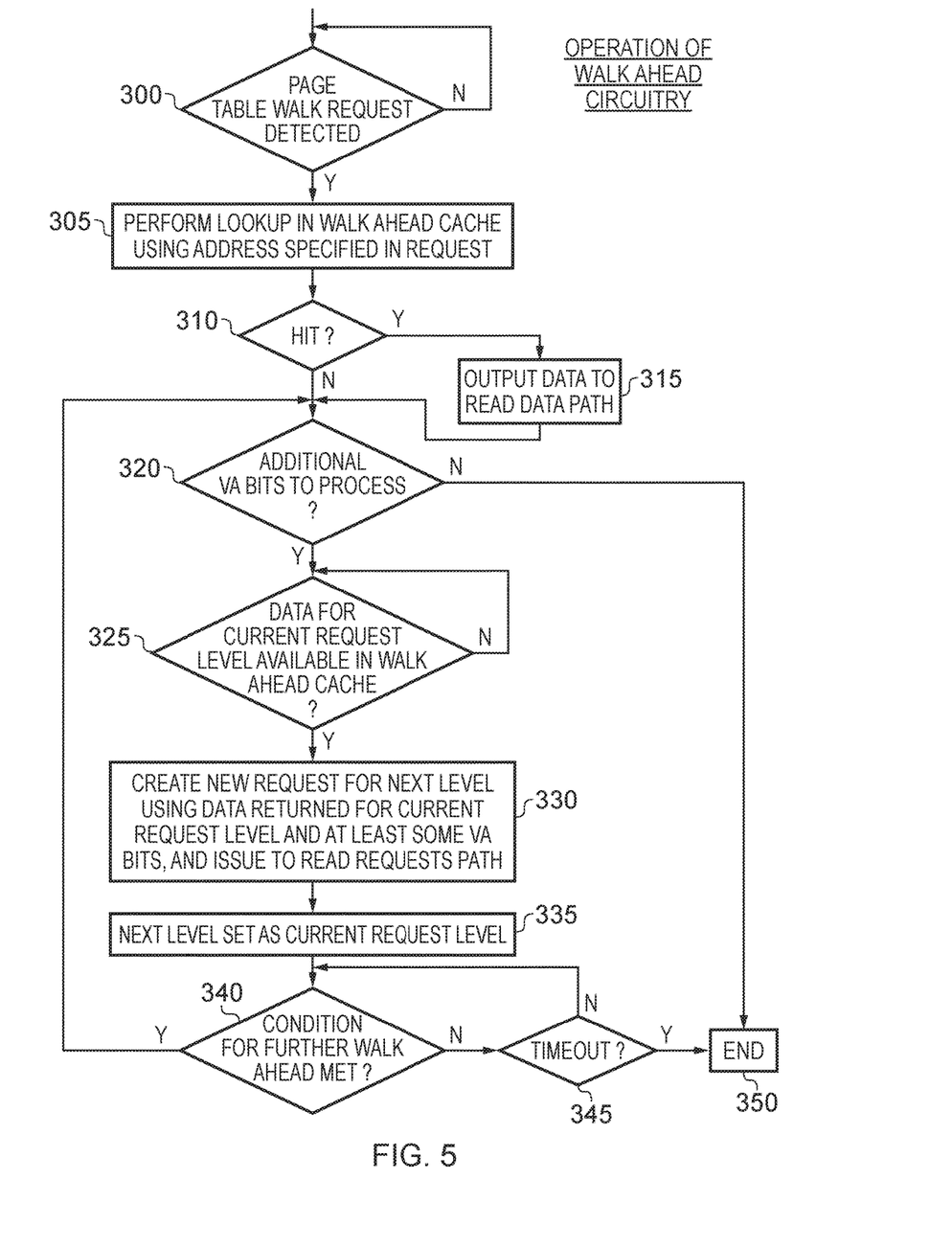
FIG. 5 is a flow diagram illustrating the operation of the walk ahead circuitry of FIG. 1 in accordance with one embodiment.

FIG. 5 is a flow diagram illustrating the operation of the walk ahead circuitry in accordance with one embodiment. At step 300, the detection circuitry 200 determines whether a page table walk request has been issued, which requires some prefetching to be performed. Once such a page table walk request has been detected, then at step 305 a lookup is performed in the walk ahead cache 210 using the address specified in that page table walk request, in order to determine whether the requested descriptor is present in the cache. Hence, at step 310 it is determined whether there was a hit in the cache, and if there was the required data is output to the read data path at step 315. Irrespective of whether there is a hit or not, the process then proceeds to step 320 where it is determined whether there are any other additional virtual address bits to process, i.e. whether any of the virtual address bits specified in the field 265, 265' have not yet been utilised. On the first iteration through the process of FIG. 5, this will be the case, and accordingly the process will proceed to step 325.

At step 325, it is then determined whether the data required for the current request level is available in the walk ahead cache. In particular, as discussed earlier, the further request generation circuitry 205 will only be able to issue a prefetch memory request once the descriptor at the current request level (i.e. that descriptor that is the subject of the memory page table walk request for the first iteration) is available within the walk ahead cache 210. When that descriptor information is available in the walk ahead cache 210, then the process will proceed to step 330, where a new prefetch memory request will be created for the next level using the data returned for the current request level and at least some of the virtual address bits specified in the page table walk read request. That new prefetch memory request will then be issued to the read requests path 215 for subsequent processing by the memory device. At this point, the next level (i.e. the level for which the prefetch memory request has just been issued) is then set as the current request level at step 335, whereafter it is determined at step 340 whether a condition for further walk ahead processing is met.

In one embodiment, the walk ahead circuitry may merely be arranged to perform prefetching of all of the subsequent levels of the address translation up to and including the specified data item, with all of the associated descriptors and associated data item then being stored in the walk ahead cache 210. However, in an alternative embodiment the prefetching may be throttled in some manner, so that the prefetching does not get too far ahead of the current level being considered by the MMU 14, 60. For example, the walk ahead circuitry may be configured to only prefetch a maximum of two levels ahead of the current level being considered by the MMU. Accordingly, at step 340 it will be determined at what level the MMU is currently making a page table walk request for, before determining whether it is appropriate to continue further prefetching.

If the condition is not met, then a timeout mechanism may be employed to wait for a predetermined period of time, in the hope that the condition will be met before the timeout threshold is reached. If it is, then the process will branch back to step 320, however if the timeout threshold expires without the condition for further walk ahead being met, then the process may end at step 350. The process will also end at step 350 if at step 320 it is determined that all of the additional virtual address bits have been processed.

If the condition for further walk ahead processing is met at step 340, then steps 320, 325, 330 and 335 are repeated until either all of the additional virtual address bits have been processed, or the condition for further walk ahead processing is not met within the timeout threshold period.

Whilst the walk ahead circuitry is merely speculatively prefetching information that the MMU and associated processing circuitry may subsequently require, and hence there are no adverse consequences on the correct operation of the system by prefetching information that may in fact not later be needed, there will be a power consumption effect associated with the prefetching operations, and this can be one reason for introducing a condition at step 340 to throttle the degree to which the walk ahead circuitry prefetches ahead of the actual requirements of the MMU/associated processing circuitry. For example, in some situations it may that the descriptors associated with one or more subsequent levels of the page hierarchy, or the actual data item ultimately requested, may already be cached in one of the levels of cache 20, 22, 30 within the system, and accordingly the subsequent page table walk requests and/or the modified memory access request may not ever be propagated as far as the walk ahead circuitry. Accordingly, the prefetched information held in the walk ahead cache of the walk ahead circuitry would not be utilised in that instance, and the prefetching would have wasted some power consumption unnecessarily. However, by specifying a condition for further walk ahead processing at step 340, the desire to reduce latency by performing the prefetching can be balanced against the power consumption consumed in doing so, dependent on implementation requirements.

The walk ahead circuitry can be located at a variety of positions within the apparatus. In some embodiments the walk ahead circuitry may reside between the MMU 14, 60 and the memory device 40. In one embodiment, the walk ahead circuitry is incorporated within a memory controller 400 associated with the memory device, as for example shown in FIG. 6. In the example, the memory controller 400 is associated with a DRAM memory device 415. Read memory access requests issued by the various processing circuits are buffered within the read request queue 405 prior to being forwarded to the memory device 415. Typically read request lookup circuitry 425 will monitor the contents of the read request queue and perform a lookup in the read data queue 420 in order to detect situations where the read data being requested has already been retrieved from the memory device. In those situations, read data can be provided directly from the read data queue, without having to perform an access to the memory device. However, for read requests that cannot be serviced directly from the contents of the read data queue, the scheduler 410 will schedule the various read requests for processing by the memory device, and will issue appropriate control commands to the memory device to cause the memory device to process the read access requests. The retrieved read data will then be returned to the read data queue 420 from where it can be returned to the requesting processing circuit/MMU.

Figure 6:
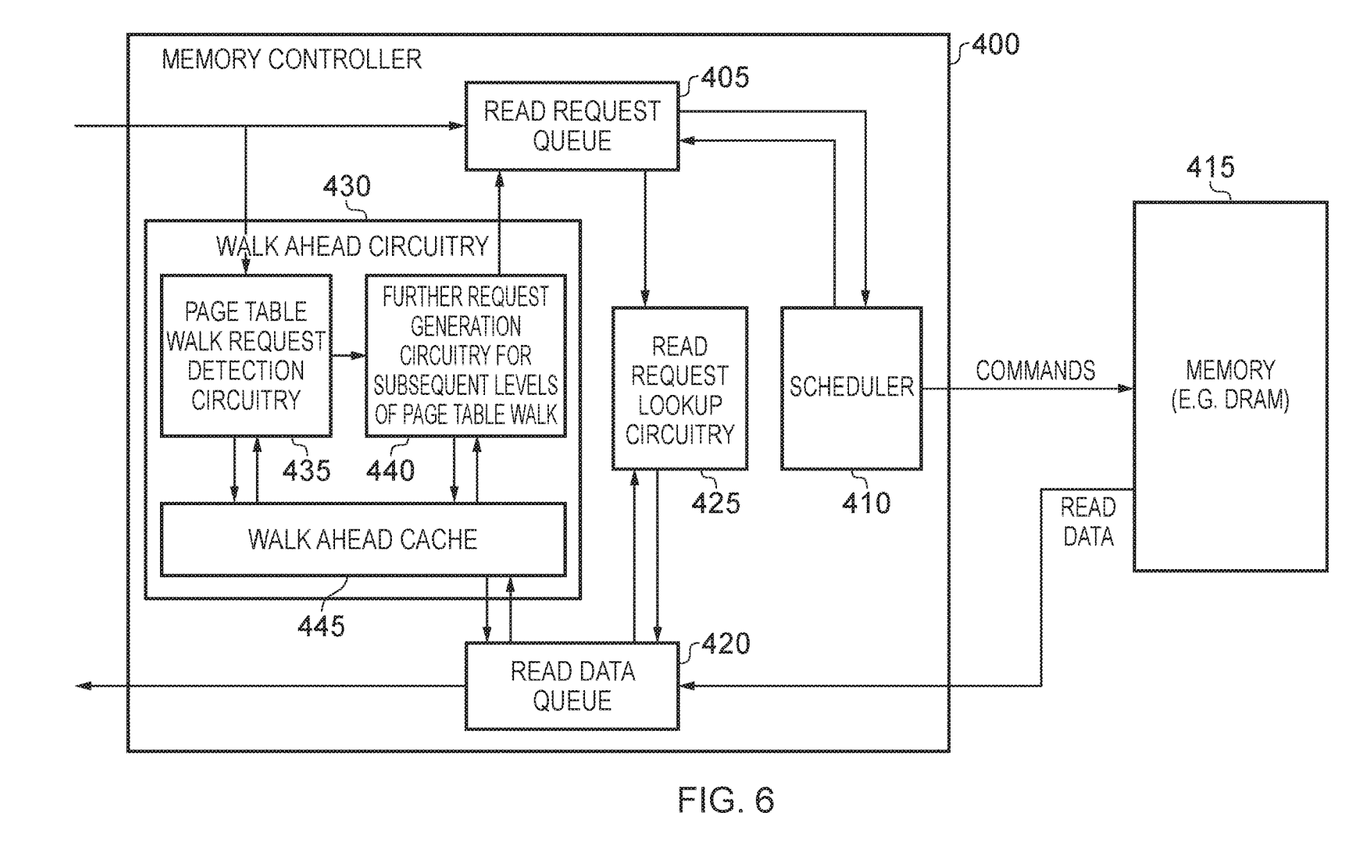
FIG. 6 illustrates how the walk ahead circuitry may be incorporated within a memory controller in accordance with one embodiment.

In one embodiment, the walk ahead circuitry takes the form of the walk ahead circuitry 430 shown in FIG. 6, consisting of the detection circuitry 430, further request generation circuitry 440 and the walk ahead cache 445. These components correspond directly to the components 200, 205, 210 discussed in relation to the walk ahead circuitry 35 in FIG. 3. The additional prefetch requests generated by the further request generation circuitry 440 are inserted into the read request queue 405 for processing by the scheduler 410 and memory device 415 in due course. The returned descriptors and/or data items obtained as a result of processing those prefetch requests are then routed from the read data queue into the walk ahead cache 445.

Figure 7:
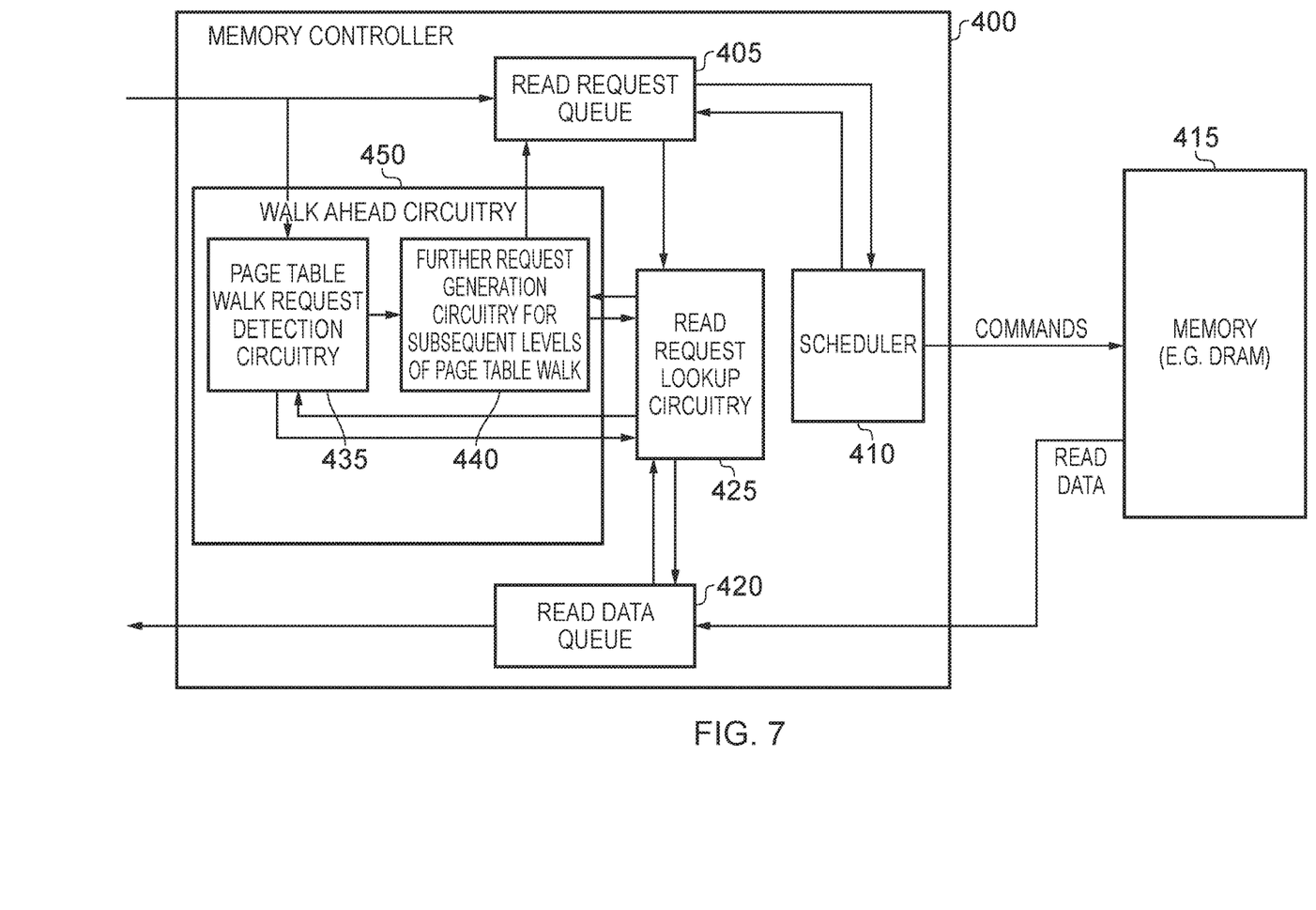
FIG. 7 illustrates how the walk ahead circuitry may be incorporated within a memory controller in accordance with an alternative embodiment.

In an alternative embodiment as shown in FIG. 7, the walk ahead cache can be subsumed into the read data queue 420, avoiding the need for a separate walk ahead cache. In that instance, the detection circuitry 435 and the further request generation circuitry 440 will use the read request lookup circuitry 425 to perform the necessary lookups within the walk ahead cache provided as part of the read data queue 420. Such an approach can reduce the hardware cost associated with providing the walk ahead circuitry within the memory controller.

Through use of the techniques of the described embodiments, the load-to-use latency associated with the address translation process can be significantly reduced, thereby improving application performance within the data processing apparatus. The walk ahead circuitry of the described embodiments can be operated opportunistically, in order to walk ahead and use less busy periods of operation of the memory device to prefetch descriptors that may be required by an MMU and data items that may be required by the processing circuitry, by resolving the table walks ahead of time and prior to those table walks actually being issued by the associated MMU. This lowers the load-to-use latency for the processing circuitry.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
   processing circuitry configured to issue a memory access request specifying a virtual address for a data item;
   address translation circuitry configured to perform an address translation process with reference to at least one descriptor provided by at least one page table, in order to produce a modified memory access request specifying a physical address for the data item, the address translation circuitry including page table walk circuitry configured to generate at least one memory page table walk request in order to retrieve the at least one descriptor required for the address translation process;
   walk ahead circuitry located in a path between the address translation circuitry and a memory device containing the at least one page table, the walk ahead circuitry comprising:
      detection circuitry configured to detect a memory page table walk request generated by the page table walk circuitry of the address translation circuitry for a descriptor in a page table; and
      further request generation circuitry configured to generate a prefetch memory request in order to prefetch data from the memory device at a physical address determined with reference to the descriptor requested by the detected memory page table walk request, wherein:
   the page table walk circuitry is configured to include, within the detected memory page table walk request, additional information not required to retrieve the descriptor requested by that detected memory page table walk request; and
   the further request generation circuitry is configured to use said additional information when generating said prefetch memory request.

2. A data processing apparatus as claimed in claim 1, wherein the data prefetched from the memory device in response to the prefetch memory request is one of the data item required by the modified memory access request and a further descriptor required by the address translation process.

3. A data processing apparatus as claimed in claim 1, wherein:
   the page table walk circuitry is configured to use a portion of the virtual address in order to determine a descriptor address, and to include within the detected page table walk request said descriptor address; and
   the page table walk circuitry is further configured to include, as said additional information, a further portion of the virtual address.

4. A data processing apparatus as claimed in claim 1, wherein:
   the address translation circuitry is configured to perform, as the address translation process, a multi-level address translation process with reference to descriptors provided by a plurality of page tables configured in multiple hierarchical levels, and the page table walk circuitry is configured to generate memory page table walk requests in order to retrieve the descriptors required for the multi-level address translation process;
   the memory page table walk request detected by the detection circuitry is for a descriptor in a page table at one hierarchical level; and
   the further request generation circuitry is configured to generate as the prefetch memory request, for each of at least one subsequent hierarchical level, a prefetch memory page table walk request in order to prefetch an associated descriptor in a page table at that subsequent hierarchical level.

5. A data processing apparatus as claimed in claim 4, wherein:
   the further request generation circuitry is configured to determine a descriptor address for the associated descriptor in a page table at a first subsequent hierarchical level with reference to said further portion of the virtual address and the descriptor retrieved as a result of the memory device processing the detected memory page table walk request; and
   the further request generation circuitry is further configured to include the determined descriptor address within the generated prefetch memory page table walk request for said first subsequent hierarchical level.

6. A data processing apparatus as claimed in claim 5, wherein for each additional subsequent hierarchical level, the further request generation circuitry is configured to determine a descriptor address for the associated descriptor in a page table at that additional subsequent hierarchical level with reference to said further portion of the virtual address and the descriptor obtained as a result of the memory device processing the prefetch memory page table walk request for a preceding subsequent hierarchical level.

7. A data processing apparatus as claimed in claim 4, wherein:
   the further request generation circuitry is configured to generate, for each of multiple subsequent hierarchical levels, a prefetch memory page table walk request; and
   the page table walk circuitry is further configured to include within the detected page table walk request, level indication data used by the further request generation circuitry to determine which bits of the further portion of the virtual address to use when generating the prefetch memory page table walk request at each of the multiple subsequent hierarchical levels.

8. A data processing apparatus as claimed in claim 4, wherein said at least one subsequent hierarchical level includes a final hierarchical level, and the further request generation circuitry is further configured to generate a prefetch modified memory access request specifying a physical address for the data item in order to prefetch the data item.

9. A data processing apparatus as claimed in claim 4, wherein the walk ahead circuitry further includes a walk ahead storage structure configured to store the associated descriptor retrieved from the memory device as a result of each prefetch memory page table walk request.

10. A data processing apparatus as claimed in claim 9, wherein the walk ahead storage structure is further configured to store the prefetched data item retrieved from the memory device as a result of the prefetch modified memory access request.

11. A data processing apparatus as claimed in claim 9, wherein the walk ahead storage structure is configured as a cache.

12. A data processing apparatus as claimed in claim 4, wherein the walk ahead circuitry is configured to be responsive to control information to determine the number of subsequent hierarchical levels for which associated descriptors are prefetched ahead of a current hierarchical level for which the page table walk circuitry has generated a memory page table walk request.

13. A data processing apparatus as claimed in claim 1, wherein the walk ahead circuitry is provided within a memory controller associated with the memory device.

14. A data processing apparatus as claimed in claim 13, wherein the walk ahead circuitry is configured to re-use at least one existing component of the memory controller.

15. A data processing apparatus as claimed in claim 14, wherein the walk ahead storage structure is provided by a read data queue within the memory controller.

16. A data processing apparatus as claimed in claim 4, wherein a descriptor provided in a page table at one hierarchical level provides a base address for a page table in a subsequent hierarchical level.

17. A data processing apparatus as claimed in claim 4, wherein a descriptor provided in a page table at a final hierarchical level provides a base address for a memory page containing the data item associated with the virtual address specified in the memory access request.

18. A data processing apparatus as claimed in claim 1 wherein the page table walk circuitry is configured to include, within the detected memory page table walk request, a flag field set to identify the request as a memory page table walk request.

19. Walk ahead circuitry for use in a data processing apparatus having processing circuitry for issuing a memory access request specifying a virtual address for a data item, and address translation circuitry for performing an address translation process with reference to at least one descriptor provided by at least one page table, in order to produce a modified memory access request specifying a physical address for the data item, the address translation circuitry generating at least one memory page table walk request in order to retrieve the at least one descriptor required for the address translation process, the walk ahead circuitry being configured for locating in a path between the address translation circuitry and a memory device containing the at least one page table, and comprising:
    detection circuitry configured to detect a memory page table walk request generated by the address translation circuitry for a descriptor in a page table; and
    further request generation circuitry configured to generate a prefetch memory request in order to prefetch data from the memory device at a physical address determined with reference to the descriptor requested by the detected memory page table walk request, wherein:
    the detected memory page table walk request includes additional information not required to retrieve the descriptor requested by that detected memory page table walk request and
    the further request generation circuitry is configured to use said additional information when generating said prefetch memory request.

20. A walk ahead circuit comprising:
    detection circuitry configured to detect a memory page table walk request generated by page table walk circuitry of an address translation circuit for a descriptor in a page table; and
    further request generation circuitry configured to generate a prefetch memory request in order to prefetch data from a memory device at a physical address determined with reference to the descriptor requested by the detected memory page table walk request, wherein:
    the detected memory page table walk request includes additional information not required to retrieve the descriptor requested by that detected memory page table walk request; and
    the further request generation circuitry is configured to use said additional information when generating said prefetch memory request.

21. A method of handling address translation within a data processing apparatus, comprising:
    issuing from processing circuitry a memory access request specifying a virtual address for a data item;
    employing address translation circuitry to perform an address translation process with reference to at least one descriptor provided by at least one page table, in order to produce a modified memory access request specifying a physical address for the data item, including generating at least one memory page table walk request in order to retrieve the at least one descriptor required for the address translation process;
    employing walk ahead circuitry located in a path between the address translation circuitry and a memory device containing the at least one page table, to:
        detect a memory page table walk request generated by the page table walk circuitry of the address translation circuitry for a descriptor in a page table; and
        to generate a prefetch memory request in order to prefetch data from the memory device at a physical address determined with reference to the descriptor requested by the detected memory page table walk request, wherein:
    the detected memory page table walk request includes additional information not required to retrieve the descriptor requested by that detected memory page table walk request; and
    employing said walk ahead circuitry to generate a prefetch memory request further comprises using said additional information when generating said prefetch memory request.

22. A data processing apparatus comprising:
    means for issuing a memory access request specifying a virtual address for a data item;
    means for performing an address translation process with reference to at least one descriptor provided by at least one page table, in order to produce a modified memory access request specifying a physical address for the data item, the means for performing including means for generating at least one memory page table walk request in order to retrieve the at least one descriptor required for the address translation process;
    means for locating in a path between the address translation means and a memory device containing the at least one page table, the means for locating comprising:
        means for detecting a memory page table walk request generated by the means for generating at least one memory page table walk request of the means for performing for a descriptor in a page table; and
        means for generating a prefetch memory request in order to prefetch data from the memory device at a physical address determined with reference to the descriptor requested by the detected memory page table walk request, wherein:
    the means for generating at least one memory page table walk request is configured to include, within the detected memory page table walk request, additional information not required to retrieve the descriptor requested by that detected memory page table walk request; and the means for generating a prefetch memory request is configured to use said additional information when generating said prefetch memory request.

\* \* \* \* \*